(12) United States Patent
Sobotka

(10) Patent No.: US 11,093,910 B2
(45) Date of Patent: Aug. 17, 2021

(54) TRANSFER OF DIGITAL CURRENCY ENCRYPTION KEYS THROUGH THE PROCESS OF ISSUANCE, VALIDATION AND DEVALUATION OF PHYSICAL MEDIUM WITH MULTI-FACTOR AUTHORIZATION, AND THE PHYSICAL MEDIUM OF ENCRYPTION KEYS FOR DIGITAL CURRENCY TO CONDUCT THIS TRANSFER TECHNOLOGY

(71) Applicant: Petr Sobotka, Prague (CZ)

(72) Inventor: Petr Sobotka, Prague (CZ)

( * ) Notice: Subject to any disclaimer, the term of this patent is extended or adjusted under 35 U.S.C. 154(b) by 501 days.

(21) Appl. No.: 15/752,983

(22) PCT Filed: Aug. 19, 2016

(86) PCT No.: PCT/CZ2016/000094
§ 371 (c)(1),
(2) Date: Feb. 15, 2018

(87) PCT Pub. No.: WO2017/028828
PCT Pub. Date: Feb. 23, 2017

(65) Prior Publication Data
US 2018/0240086 A1 Aug. 23, 2018

(30) Foreign Application Priority Data
Aug. 20, 2015 (CZ) .............................. CZ 2015-562

(51) Int. Cl.
*G06Q 20/06* (2012.01)
*G06Q 20/38* (2012.01)
(Continued)

(52) U.S. Cl.
CPC ......... *G06Q 20/0658* (2013.01); *G06Q 20/06* (2013.01); *G06Q 20/065* (2013.01);
(Continued)

(58) Field of Classification Search
CPC .. G06Q 20/0658; G06Q 20/06; G06Q 20/065; G06Q 20/3823; G06Q 20/3825;
(Continued)

(56) References Cited

U.S. PATENT DOCUMENTS

| | | | |
|---|---|---|---|
| 2007/0058260 A1* | 3/2007 | Steenblik | B42D 25/355 359/626 |
| 2007/0165208 A1* | 7/2007 | Cowburn | G03G 21/046 356/71 |
| 2013/0166455 A1* | 6/2013 | Feigelson | G06Q 30/06 705/64 |
| 2014/0164251 A1* | 6/2014 | Loh | G06Q 20/065 705/67 |

(Continued)

OTHER PUBLICATIONS

N2liquid, Redeeming of a Casascius Coin, Mar. 9, 2013 (Year: 2013).*
(Continued)

*Primary Examiner* — Jacob C. Coppola
*Assistant Examiner* — Timothy Paul Sax
(74) *Attorney, Agent, or Firm* — Notaro, Michalos & Zaccaria P.C.

(57) ABSTRACT

A method of a transfer of the digital currency encryption keys through the process of issuance, validation and devaluation of physical medium with multi-factor authorization is disclosed. The medium is distributed on the market as blank and to which belongs a second authorization factor safely stored with the manufacturer or integrated into the medium in form of a tamper-evident box, is loaded by an issuer using a SW application for the medium issuance and based on a first authorization factor generated by the issuer, an identifier of the medium and other data an address is derived and passed to the issuer to which he sends the balance of the digital currency in an amount equivalent to the denomination of the medium. A physical medium of encryption keys for the digital currency is also disclosed.

4 Claims, 14 Drawing Sheets

(51) Int. Cl.
  *H04L 9/08* (2006.01)
  *H04L 9/14* (2006.01)
  *H04L 9/32* (2006.01)
  *G06K 19/06* (2006.01)

(52) U.S. Cl.
  CPC ..... *G06Q 20/3823* (2013.01); *G06Q 20/3825* (2013.01); *G06Q 20/3829* (2013.01); *H04L 9/0819* (2013.01); *H04L 9/14* (2013.01); *H04L 9/3247* (2013.01); *G06K 19/06037* (2013.01); *G06Q 2220/00* (2013.01); *H04L 2209/56* (2013.01)

(58) Field of Classification Search
  CPC ..... G06Q 20/3829; H04L 9/0819; H04L 9/14; H04L 9/3247
  See application file for complete search history.

(56) References Cited

U.S. PATENT DOCUMENTS

| | | | |
|---|---|---|---|
| 2014/0379362 A1* | 12/2014 | Bachenheimer | G06Q 50/24 705/2 |
| 2015/0164192 A1* | 6/2015 | Gross | G06Q 20/3829 232/4 R |
| 2015/0199675 A1 | 7/2015 | Rinaldi | |
| 2015/0310497 A1* | 10/2015 | Valin | G06Q 10/107 705/14.66 |

OTHER PUBLICATIONS

International Search Report for corresponding PCT/CZ2016/000094, dated Dec. 12, 2016.
Written Opinion for corresponding PCT/CZ2016/000094, dated Feb. 23, 2017.

* cited by examiner

TRANSFER OF DIGITAL CURRENCY ENCRYPTION KEYS THROUGH THE PROCESS OF ISSUANCE, VALIDATION AND DEVALUATION OF PHYSICAL MEDIUM WITH MULTI-FACTOR AUTHORIZATION, AND THE PHYSICAL MEDIUM OF ENCRYPTION KEYS FOR DIGITAL CURRENCY TO CONDUCT THIS TRANSFER TECHNOLOGY

FIELD OF THE INVENTION

The present invention pertains to the field of digital currency and electronic payment network based on cryptography and decentralization such as Bitcoin, Litecoin etc. The invention relates to the methods and procedures to transfer these financial instruments into the physical world and to create a corresponding physical embodiment of this payment means in the form of a medium of encryption keys for digital currency.

BACKGROUND OF THE INVENTION

Figure 1:

Since the establishment of Bitcoin digital cryptocurrency at the turn of 2008/2009 there have been attempts to transfer this electronic currency into the physical world. The easiest and most common way is to create a "Paper Wallet" (FIG. 1). This is in fact the paper form backup of a private encryption key achieved by using commonly available office equipment. The paper wallet contains a private encryption key in a for humans readable text and usually also in a machine readable QR code, a Bitcoin address (again, in text and QR code), and possibly a figure showing the balance, or a box where the balance amount can be written. Everything is provided with additional wording, instructions and colour graphics. The paper wallet contains no security features.

There are a number of web services/software programs for generating paper wallets (Lit. 1, 2, 3). The holder of a paper wallet really controls the digital currency balance at a relevant address. The problem is that each paper wallet may have an unlimited number of copies, therefore a paper wallet, as a physical object, does not reflect the value of a digital currency balance. A paper wallet cannot serve for payments either, because the recipient can never be sure whether the payer keeps another copy. Thus, this is really just an instrument for the backup of a private key, similarly to noting down a password for electronic banking in pencil on paper. We neither share it with anyone, nor attempt to pay by it.

Figure 6:
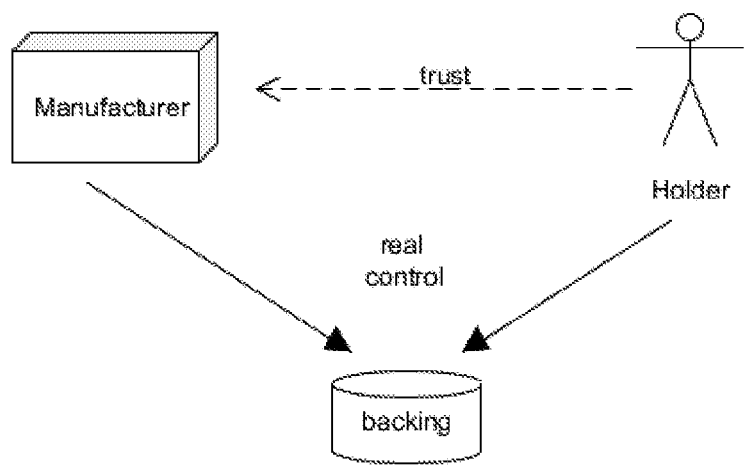

In 2011 Bitcoin Casascius coins (FIG. 3) and plastic Bitbills cards (FIG. 2) appeared on the market. Both products represent physical objects which contain an integrated private key covered with a tamper-evident sticker. In 2013 Bitcoin certificates of Bitcoin Suisse AG then appeared (FIG. 4) having the private key glued between two layers of synthetic paper. All three of these products suffer a fundamental deficiency: the manufacturer knows the private keys of all produced pieces of each payment instrument. Current holders are therefore not in an exclusive position to control the digital currency represented by physical objects; there is always a joint holder—the manufacturer. Although manufacturers pledge to have destroyed the private key information, or boast of high safety standards in production providing guarantees of no private key information leakage, this matter cannot be independently verified and there is always a certain risk that the backing of part or all of the produced units of a payment means will sooner or later be misappropriated by an initially honest manufacturer, which is equivalent to robbing own clients. The corresponding model of financial control is shown in FIG. 6.

There are attempts to prevent this situation by specification BIP 38 (Lit. 4), which allows to generate a private key protected by a password. For a certain period (2012-2013), the manufacturer of Casascius coins offered customers to order coins made in accordance with this specification. The procedure was as follows: a customer generated a password-protected private key and sent it to the Casascius manufacturer, who produced a coin for the customer with the protected key integrated in. The coin was then sent to the client-customer. In this model, the manufacturer was not given a chance to misappropriate the funds because the only one who knew the password to the private key was the customer.

Figure 7:
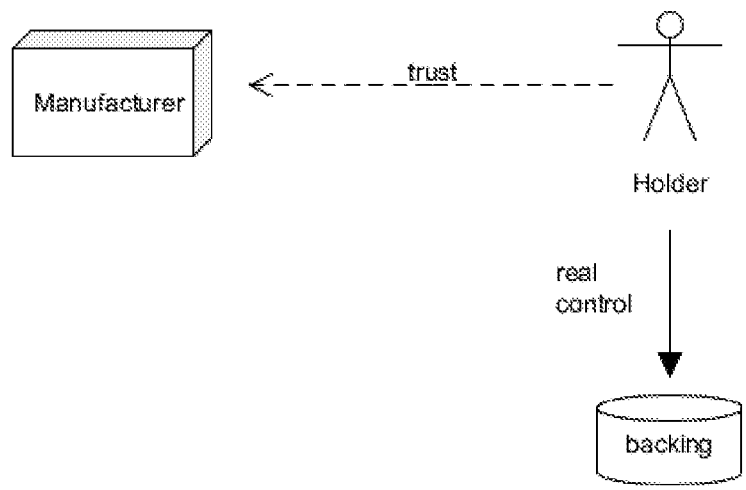

This model corresponds to the diagram drawn in FIG. 7. The coin holder does not have to worry about the misappropriation of the corresponding digital currency backing. However, such coin cannot be used as a means of payment for a simple reason: The receiver would again not become an exclusive holder since the first owner, who had ordered the coin, knows both the private key and the password. The problem is thus not solved, merely shifted one step further in the chain of holders (see FIG. 8). Except for the first holder (Client), no other current holder can exclusively control the backing by digital currency.

The manufacturers of objects based on BIP38 are aware of this fact, that is why they offer their products, rather than as a means of payment, for "offline storage" (cold storage), i.e. as a safe deposit of a digital cryptocurrency balance in the physical form.

For the time being, there is no publicly known technical solution to produce and use physical means of payment backed by digital currency in a way that a current holder would have an exclusive control over the corresponding backing. Thus, a solution that would satisfy the substance of the diagrams in FIGS. 7 and 9.

SUMMARY OF THE INVENTION

The aforementioned disadvantages of existing physical representations of digital currency are eliminated by the transfer of digital currency encryption keys through the process of issuance, validation and devaluation of physical medium with multi-factor authorization. The basic idea of this transfer process is that an issuer, using a software application for medium issuance, loads a blank medium distributed on the market, paired with the second authorization factor safely stored at the manufacturer or integrated into the medium in the form of a tamper-evident box, and generates the first authorization factor. On the basis of this first authorization factor, the medium identifier and other data he acquires the address where to send the digital currency balance in the amount equivalent to the denomination of the medium. Having inspected all required formalities, in particular the authenticity of the medium piece and the transferred sum of the digital currency balance being equal to the denomination of the medium, a digital signature is issued on request through online service. The software application for medium issuance combines the digital signature with the first authorization factor and the issuer completes the medium with these data especially by print, hand-write or a sticker. That way the medium becomes activated and passable to the next holder, even repeatedly. The recipient carries out a visual inspection and verifies the medium using a software application for medium verification, especially the amount of the digital currency balance. Then this SW application verifies the authenticity of the digital signature after loading the first authorization factor and the digital signature, The first authorization factor is validated, and the recipient compares the digitally signed data with the data visible on the medium. Then the recipient loads, using the software application for redemption of digital currency, all authorization factors available on this new duly issued physical medium in active state, possibly adds other authorization factors known to him, and compiles and authorizes an electronic transaction in the given digital currency network to redeem funds in the electronic form to the private address of the recipient. The result is the transfer of encryption keys for digital currency through the process of issuance, validation and devaluation of physical medium with multi-factor authorization, and thus effecting a payment transaction between the issuer and the final recipient in digital currency. Part of the result is also a visibly devaluated medium.

Preferably, the last recipient, who performs the redemption of digital currency funds and the final devaluation of medium is its original manufacturer, who uses for the compilation and authorization of the transaction in digital currency also other authorization factors not present on the medium and known only to him.

Preferably, the SW application for medium issuance, the SW application for medium verification and the SW application for the redemption of the digital currency funds are open-source applications, publicly accessible on the Internet. At best, all these three SW applications are represented by a single software application.

The above drawbacks of current physical representations of digital currencies are eliminated by the physical medium of encryption keys for digital currency designed for successful transfer of digital currency encryption keys whose base body is a flat plane object of any shape (in particular a geometrical figure), made of compact materials (especially plastics, paper, metals and their alloys) with one of its major plane surfaces identified with the unique alphanumeric identifier 1 and which contains, depending on a particular model, applications of protective features against counterfeiting, with one or both major plane surfaces having also boxes for receiving the first authorization factor and the digital signature.

Preferably, the base body in the form of a flat plane object has the shape of a square, rectangle or circle.

Preferably, the base body is shaped like standard credit cards, coins and banknotes.

Preferably, the base body bears on either side information on the denomination and currency unit.

Preferably, the protective features against counterfeiting in case of embodiment in paper form are in particular special security paper with watermarks or metallic strips, optically variable elements, very fine graphic elements called guilloches, iris colour gradations, colours with UV or IR luminescence, chemically reagent colours, or inaccessible printing methods.

Preferably, the protective features against counterfeiting in case of embodiment in plastic cards are mainly holograms.

Preferably, the protective features against counterfeiting in case of embodiment in metal coins are diffractive security elements (kinegrams) or electronic RFID chips.

Preferably, the unique alphanumeric identifier 1 is turned into a secured element, i.e. recoated with iridescent varnish, punched or an optically variable element.

Preferably, there is only one single box used for filling in both the first authorization factor and the digital signature.

Preferably, either of the major plane surfaces bears another box containing the second authorization factor in a tamper-evident mode.

The proposed technology to transfer digital currency encryption keys through the process of issuance, validation and devaluation of physical medium with multi-factor authorization and the physical medium of encryption keys for digital currency to conduct this technology share the following key advantages:

1. This physical form of digital currency is very difficult to counterfeit.

2. A current holder is in an exclusive position to control the digital currency used for backing a certain medium. In other words, none of the previous holders nor the manufacturer can misappropriate the backing.

3. The backing (issuance) of physical medium is easily feasible using commonly available office and computer equipment and an internet connection.

4. The verification of physical medium is easily feasible using commonly available mobile computer equipment and pre-installed software, even with no internet connection.

5. In case a physical medium contains also the second authorization factor in a tamper-evident mode, anyone may cancel the backing and redeem the funds using commonly available (mobile) computer equipment and internet access, but devaluation/evident damage to the medium will occur at the same time.

Compared to current physical products aimed at preserving the balance of digital currencies, the invention means a major qualitative leap forward, mainly due to points 2 and 4.

When compared with currently available means of payment as the products of banks and states (banknotes, coins, cheques), the submitted invention also brings a fundamental innovation. Commonly available means of payment are based on direct trust (FIG. 5), and if confidence in their manufacturers fades, the payment instruments immediately lose their function and value. The holder cannot directly (factually) control the relevant backing of a certain payment instrument. The holder's and the manufacturer's positions are not equal, therefore in case of bankruptcy of the manufacturer or a monetary reform, the holder usually loses the whole value represented by these substitutes.

The invention of physical media of encryption keys for digital currency gives a birth to a means of payment which preserves its value regardless of the economic situation of the manufacturer. In case physical media containing also the second authorization factor in a tamper-evident mode, neither bankruptcy nor possible liquidation of the manufacturer have effect on the value of issued media.

The invented physical medium of encryption keys for digital currency bears, unlike the mentioned money substitutes, its intrinsic value equivalent to the balance in the digital currency. This intrinsic value is similar as if the means of payment were directly precious metals (gold, silver). Such tenders, usually coins, also have their intrinsic value which is independent of the entity of manufacturer.

The present invention allows to perform the metamorphosis between the electronic and physical form of money in the comfort of home and without an intermediary (bank). Having the necessary amount of unbacked pieces of the described media, common office and computer equipment and an internet connection is sufficient to change the electronic to the physical representation of currency. In case of physical media with the second authorization factor 5A in a tamper-evident mode, a change in the opposite direction is also possible, without an intermediary and with only an Internet connection and a smart mobile phone or tablet.

In summary, the absolute advantage of this invention is the possibility to create a physical medium of encryption keys for digital currency and use it to perform the transfer of the digital currency encryption keys through the process of issuance, validation, and devaluation of the physical medium, while a current holder has an exclusive control over the backing of the digital currency.

LEGEND TO ATTACHED FIGURES (DRAWINGS OF THE INVENTION)

Figure 2:
Figure 3:
Figure 4:
Figure 5:
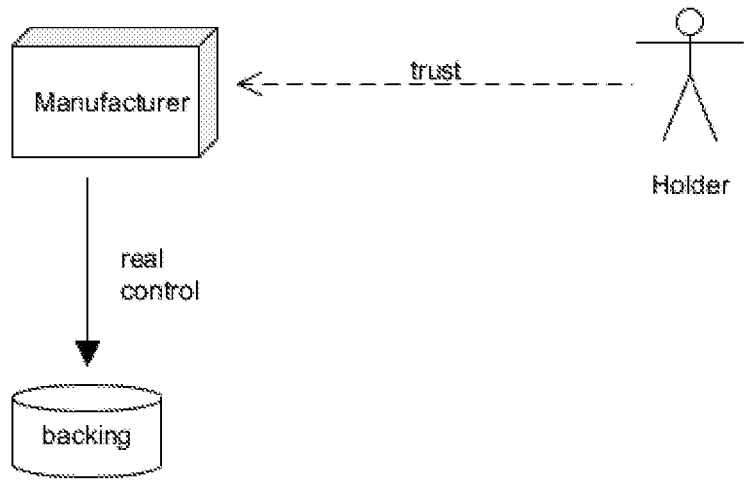
Figure 8:
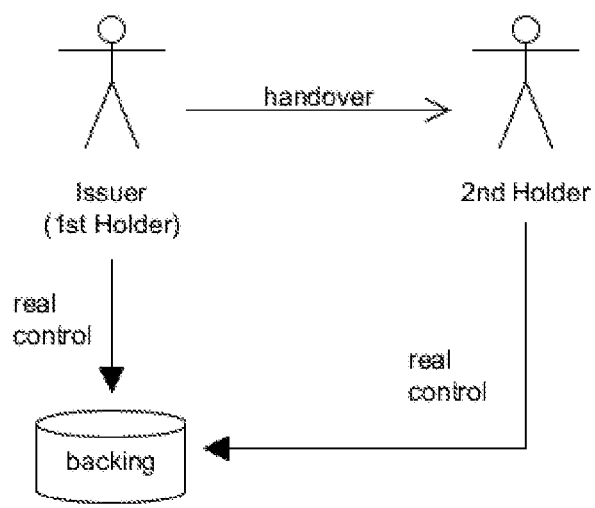
Figure 9:
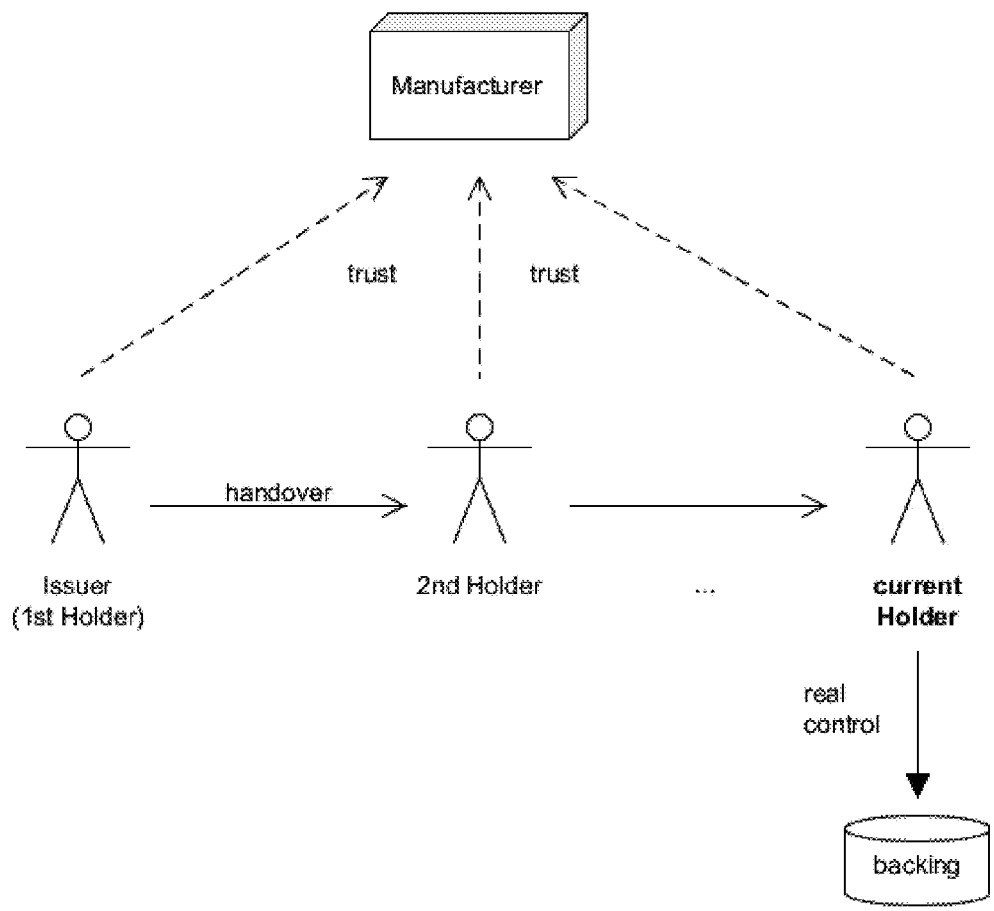
Figure 10:
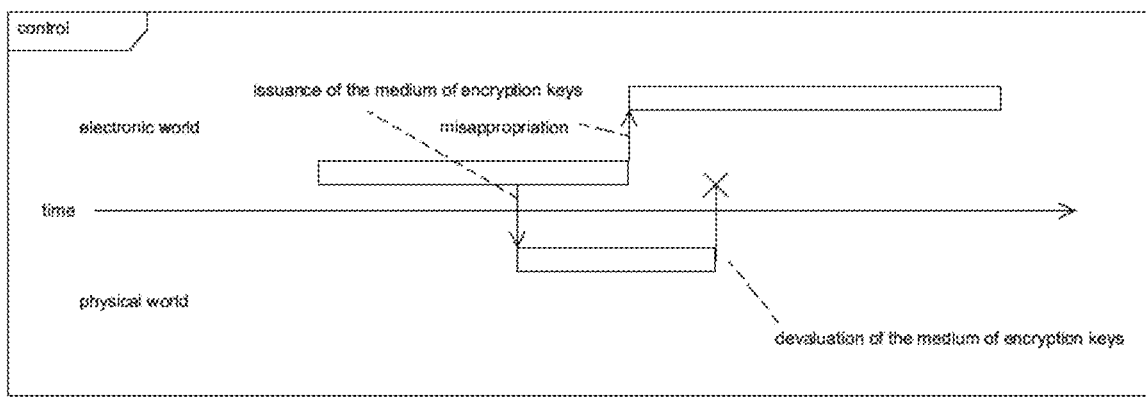
Figure 11:
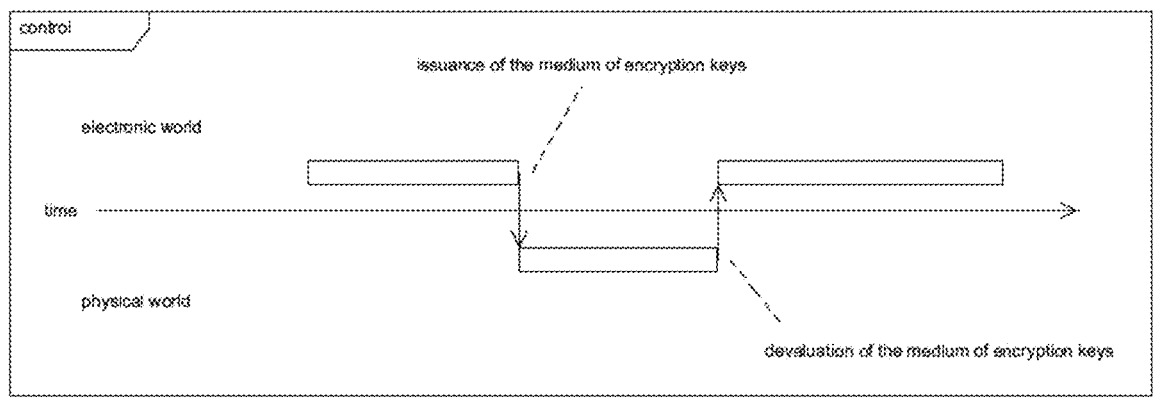
Figure 12:
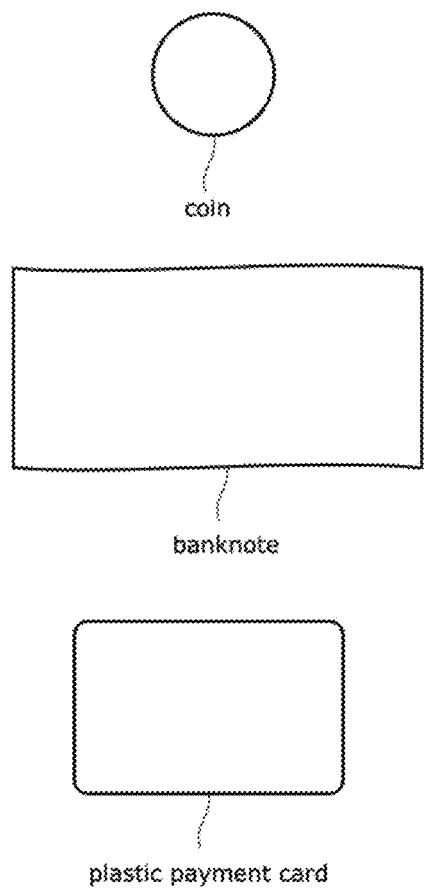
Figure 13:
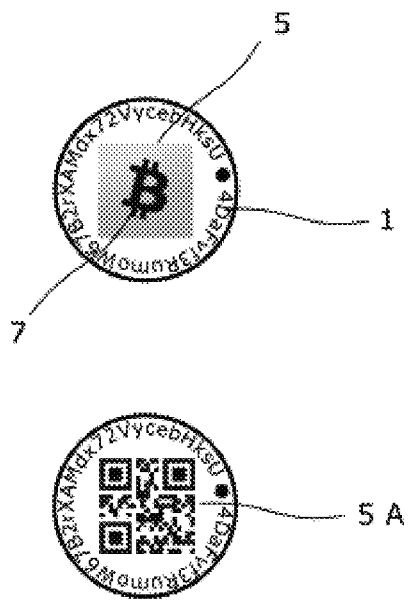
Figure 14:
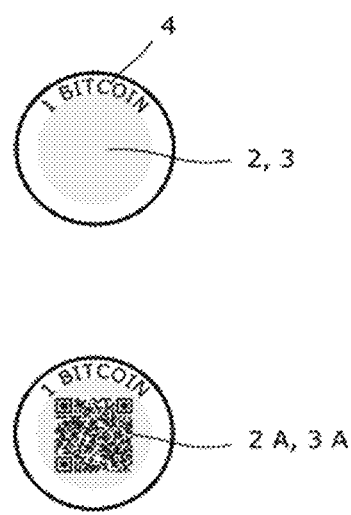
Figure 15:
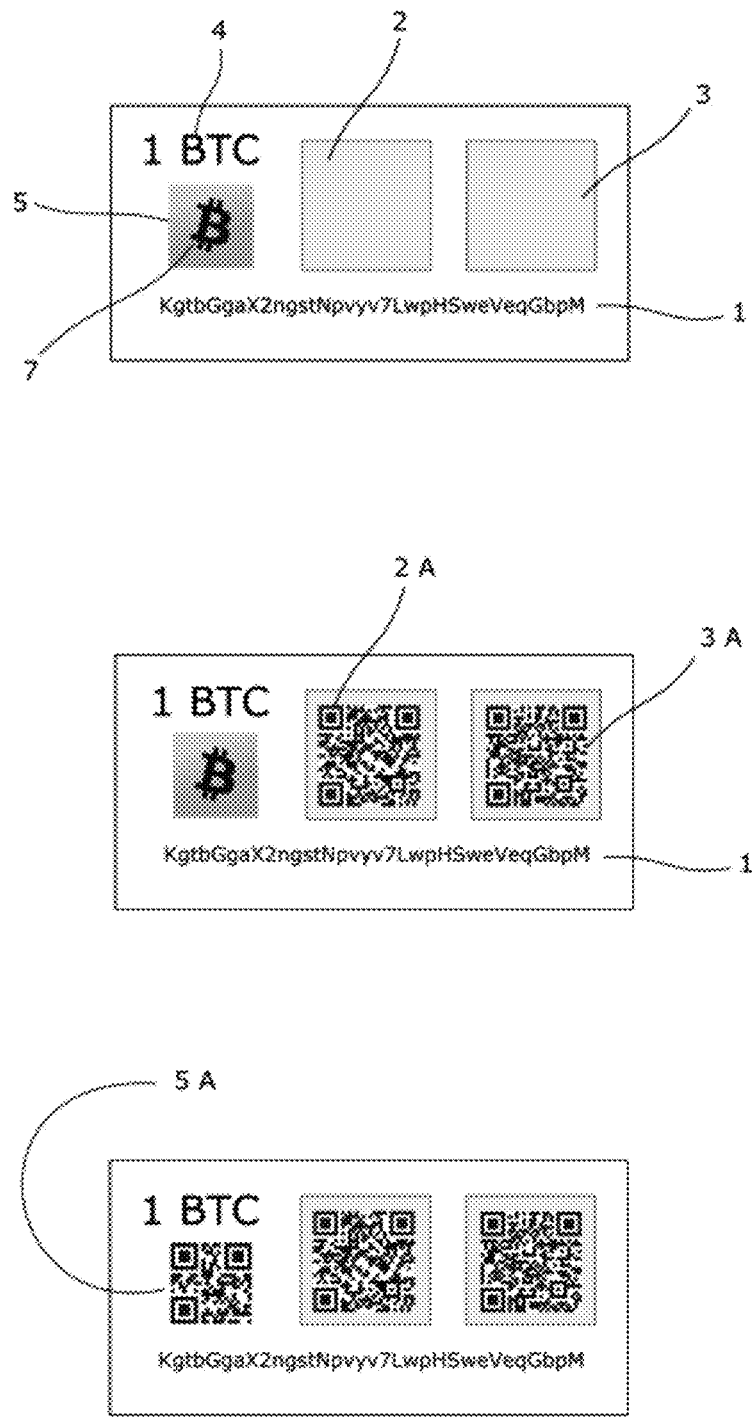
Figure 16:
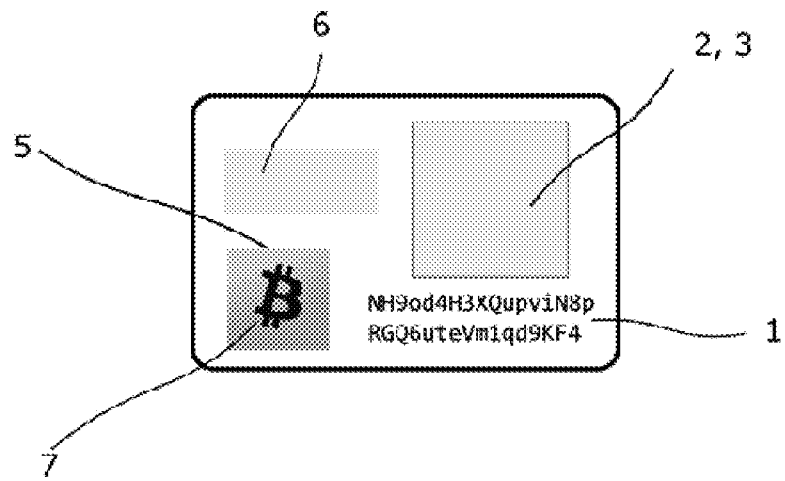
Figure 17:
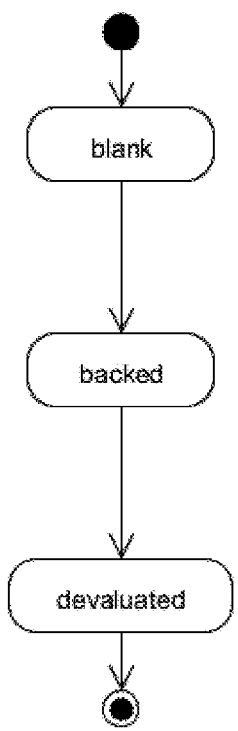
Figure 18:
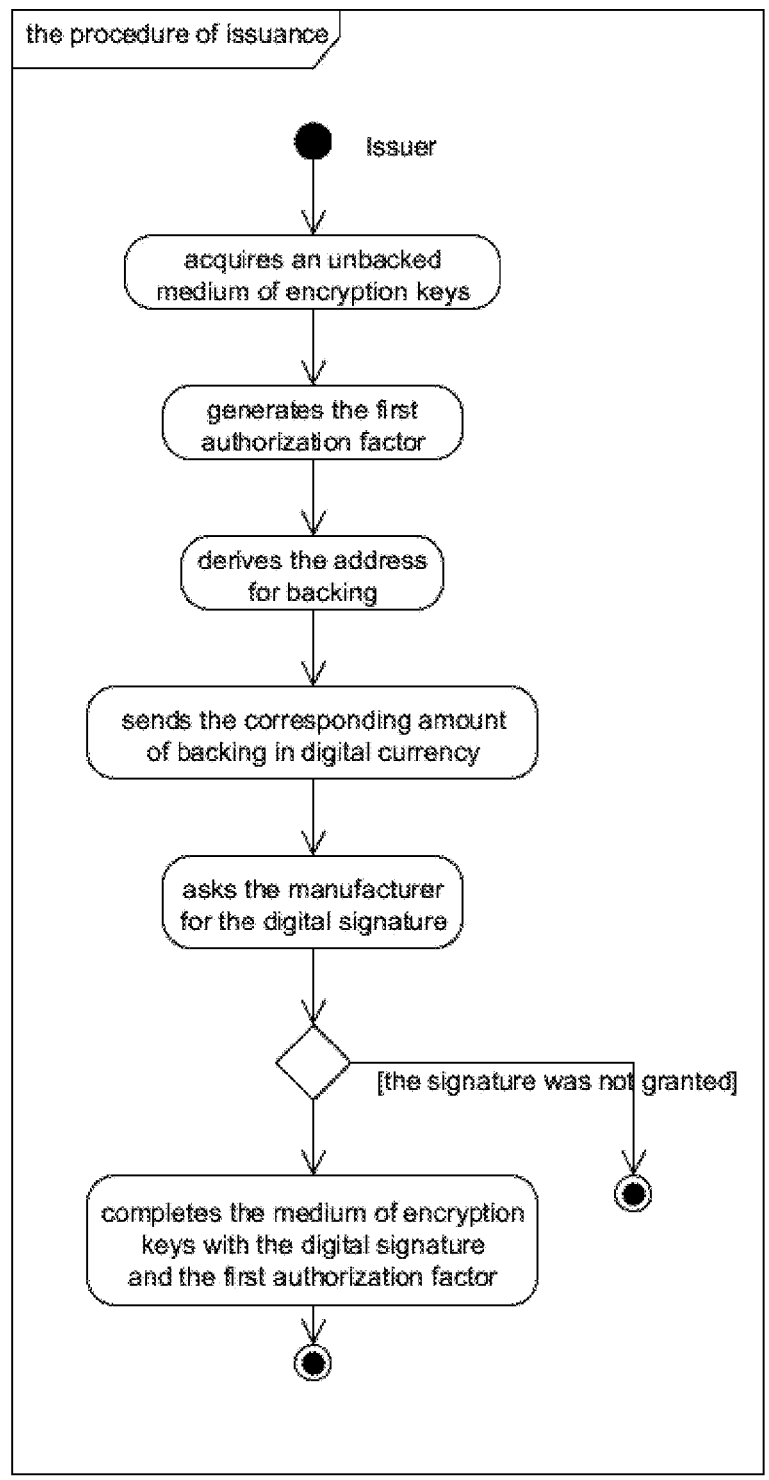
Figure 19:
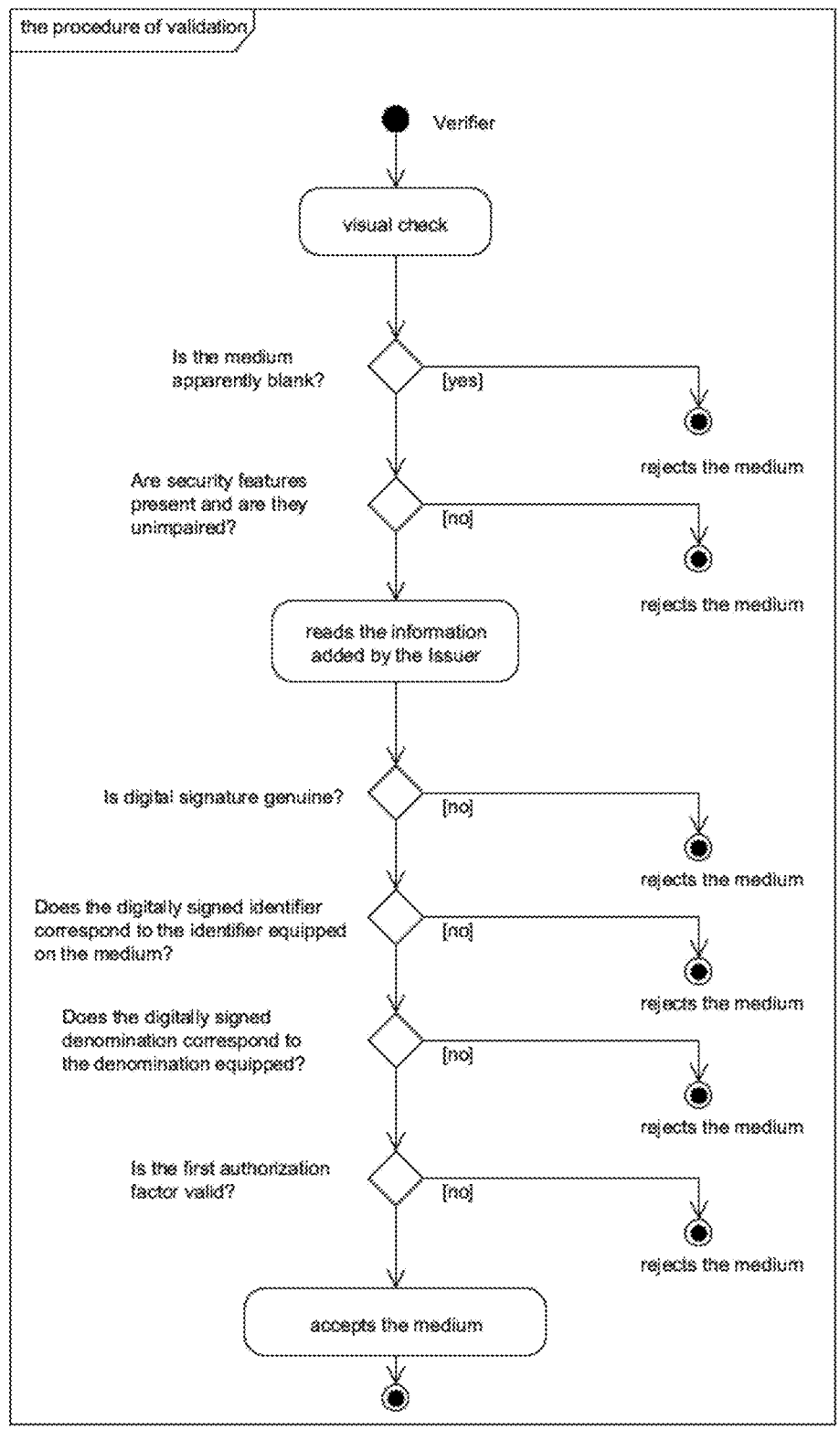
Figure 20:
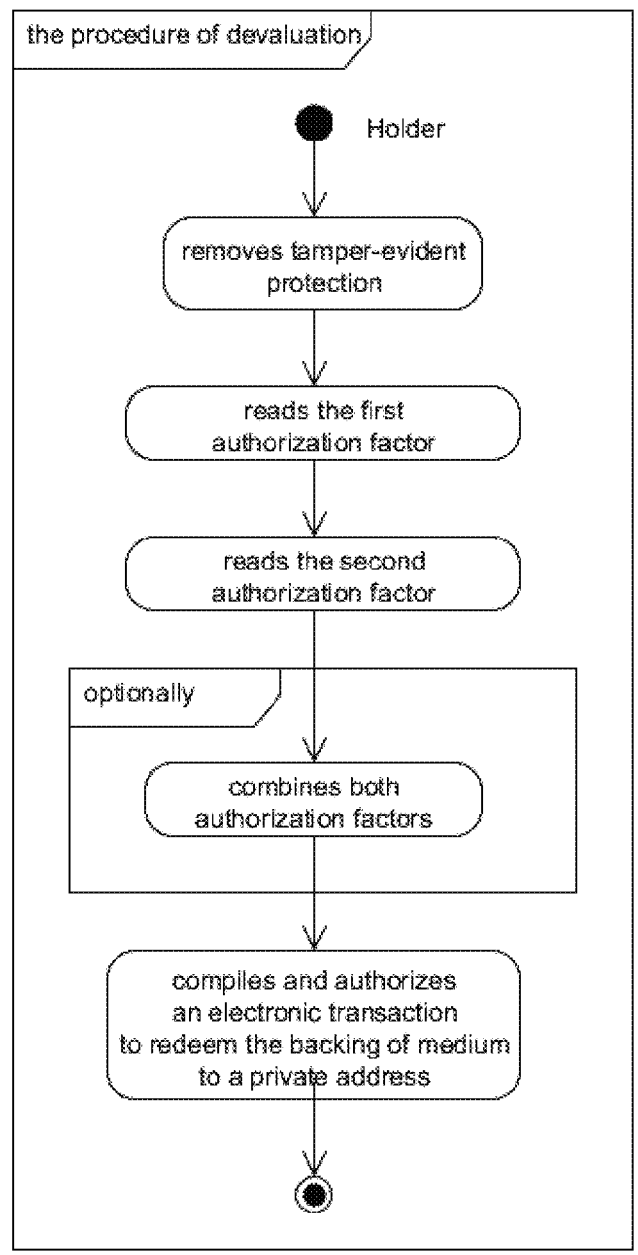

FIG. 1 Paper Wallet
FIG. 2 BitBills
FIG. 3 Casascius coins
FIG. 4 Bitcoin Certificates
FIG. 5 Indirect control of backing
FIG. 6 Non-exclusive control of backing
FIG. 7 Exclusive control of backing
FIG. 8 Holders vs. joint holders
FIG. 9 Exclusive control of current holder
FIG. 10 The mere creation of physical representation
FIG. 11 Transition between the electronic and physical representation
FIG. 12 The shapes of encryption keys media
FIG. 13 Coin—the obverse
FIG. 14 Coin—the reverse
FIG. 15 Banknote
FIG. 16 Plastic card
FIG. 17 The life cycle of medium of encryption keys for digital currency
FIG. 18 The procedure of issuance of medium of encryption keys
FIG. 19 The procedure of validation of medium of encryption keys
FIG. 20 The procedure of devaluation of medium of encryption keys

EXAMPLES OF THE INVENTION

Definitions of Basic Terms

In order to describe and explain the use of physical media with encryption keys for digital currency it is necessary to first define or clarify certain terms.

Bitcoin is a digital currency and payment network, sometimes also referred to as virtual currency, or more accurately as cryptocurrency. It works on the basis of a decentralized P2P network of computer programs with a distributed data structure known as blockchain and uses asymmetric cryptography to authorize transactions.

Digital (crypto) currencies in this text refer to the whole family of systems such as Bitcoin. Thus, all currencies and payment networks operating like Bitcoin, currencies and payment networks derived therefrom, and currencies and payment networks based on the same principles, e.g. Litecoin, DogeCoin, PrimeCoin and many others.

Payment means—unless otherwise specified, it is a physical object present in the real world, serving to hold and transfer a certain value at the payment system. It may be marked with a denomination and currency unit. Typical payment means in the context of this document are coins, banknotes, cheques, or the described invention itself.

Physical payment—an act in which two entities transfer a tangible means of payment of a certain denomination, e.g. a payment with a banknote in a shop.

Physical medium of encryption keys for digital currency is an object connected with a certain financial balance in the payment network of a given digital currency. It is usually fully legitimate only with guarantees of being the only existing instrument to control the appropriate balance, i.e. there are no more copies of this object with the same serial number.

Address of digital currency is an equivalent to the bank account number in the conventional financial system.

Public and private encryption keys are two pieces of information which enable to perform asymmetric cryptography.

Tamper-evident is the designation for a general quality and a family of technologies which are able to detect penetration into a protected environment. Their aim is not to prevent the penetration, but to reliably detect it, e.g. seals on letters, seals used by the police for securing the doors of real estates, seals used by electronics manufacturers to detect unauthorized interference with the device, scratch-off tickets, etc.

Manufacturer of physical medium of encryption keys for digital currency is an entity which launches the medium on the market under own name/brand. It may be a company, a bank or a state institution.

Issuer is a user/holder who uses an unbacked physical medium of encryption keys and issues it; similarly to the issuance of cheques.

Life Cycle of a Means of Payment

The transfer of digital currency encryption keys through the process of issuance, validation and devaluation of physical medium with a multi-factor authorization may be demonstrated on the example of the lifecycle of a means of payment in the form of a physical medium of encryption keys for digital currency. The described means of payment is distributed blank (unbacked) on the market. This state is visible at first glance, since box 2 for the first authorization factor 2A and box 3 for the digital signature 3A are blank, and possibly box 5 for the second authorization factor 5A intact. In this condition, the value of such medium is only its sales price, which can be proportional compared to the denomination stated. The best metaphor for this state is comparison to an unfilled cheque.

A customer can issue a payment instrument, i.e. to back it with balance in digital currency. See the section Issuance of Physical Medium of Encryption Keys. At that moment the medium gains the value corresponding to its denomination. Since the information on the first authorization factor 2A and the digital signature 3A is added, the medium is now distinguishable from its previous blank condition at first sight.

A backed medium can be used for payments, which requires the recipient to verify its authenticity and backing. See the section Verification of Physical Medium of Encryption Keys.

A medium may be used for payments repeatedly. There is no modification undergoing.

A holder who wishes to release the backing funds and continue to use them only electronically can devaluate the medium. This process is described in the section Devaluation of Physical Medium of Encryption Keys. That way the life cycle of a medium is by the end. In this sense, it is disposable with no functional recycling possible. Depending on the material used, it can be ecologically disposed of. The life cycle is illustrated in the state diagram in FIG. 17.

Necessary Software Infrastructure

To transfer a blank (unbacked) to a backed medium, to verify a medium and to transfer a backed to a devaluated medium (more precisely, to redeem the backing of a devaluated medium of encryption keys for digital currency), the following auxiliary software infrastructure is needed:

a) SW application for the issuance of physical medium of encryption keys. It helps customers create the first authorization factor 2A, combine it with a medium identifier and possibly other data in order to acquire the final address to which the digital currency balance will be deposited with the intention to back a specific physical medium of encryption keys for digital currency. The application also communicates with the online service for the issuance of digital signatures 3A and finally it prepares the groundwork for a suitable embodiment of the first authorization factor 2A and the digital signature 3A (e.g. it compiles data to be printed on medium).

b) Online service for the issuance of digital signatures 3A.

The manufacturer of media of encryption keys provides a public internet service for the issuance of digital signatures 3A. During the process of the medium issuance, the customer automatically communicates with this online service and after the verification of all formalities (authenticity of a physical medium of encryption keys with a specific identifier, the actual amount of backing, etc.), the manufacturer produces the digital signature 3A and sends it via the internet network to the customer.

c) SW application for the verification of physical medium of encryption keys.

It helps the payee verify the authenticity of a physical medium of encryption keys for digital currency as well as proper backing by a corresponding balance of digital currency. It may be designed e.g. for mobile devices (such as a phone or tablet) equipped with a camera, or for the payment terminals of merchants equipped with a barcode reader, etc. It serves for the facilitation of machine loading and an analysis of relevant information from a specific physical medium of encryption keys at the moment of payment.

d) SW application for the redemption of digital currency funds.

It is used to load the first and, if available, also the second authorization factor 5A on a devaluated medium and to compile a specific electronic transaction in a given digital currency network in order to redeem the funds to the private address of holder. The only task is to assist and facilitate the currency change from the physical back to the electronic form.

Distribution of SW Equipment

There is an assumption that the manufacturer of physical media of encryption keys will release an application for the issuance, an application for the verification and an application for the redemption of funds in the open-source mode, publically accessible on the Internet, in order to achieve greater transparency of the entire system and to receive possible feedback from software experts.

It can be further assumed that a publicly independent implementation of this functionality may appear from a third party in order to diversify the software infrastructure. This fact will not jeopardize the invention, on the contrary, it can strengthen the robustness of the entire system.

The software infrastructure is not subject to protection of industrial property and contains no substantial inventiveness. It mainly serves to automate and facilitate operations with physical media of encryption keys—mostly it performs routine and well-documented computing operations such as issuance of digital signature, verification of digital signature 3A, communication with the P2P network of digital currency, etc.

Technology of Two-Factor Authorization

There are multiple technologies to be used. Either the private key is divided into several parts, or it is generated from more pieces of information (see the Shamir Secret Sharing Scheme (Lit. 8)), or so-called multisig and/or P2SH transaction (Lit. 9) is used, which requires the knowledge of two or more private keys to control the balance of digital currency.

It is to mention that the cryptographic security of the entire solution is not dependent on the quality of the first authorization factor 2A generated by the issuer. On condition that the manufacturer guarantees the cryptographic strength of the second authorization factor 5A as well as the uniqueness of the second authorization factor 5A for each valuable item, and provided that the concatenation of these two factors 2A, 5A will be defined in only one possible way, then even if the issuer applies the same first authorization factor 2A for more pieces of payment means, or if he uses cryptographically weak information with low entropy, it will not endanger the security of the technology in terms of a potential attack by a third party.

Technology of Digital Signature

The specific digital signature scheme 3A is not essential for the embodiment of the invention. It appears desirable to use the digital signature 3A based on asymmetric cryptography and so-called Public Key Infrastructure (PKI). The particular algorithms may be e.g. DSA, ECDSA.

Issuance of Physical Medium of Encryption Keys

The procedure is shown in FIG. 18. A customer-issuer must have a blank (unbacked) medium of encryption keys, computer equipment with internet access and a software application for issuance. Using this SW he generates, or loads from another source, the first authorization factor. Then he loads the identifier from the physical medium of encryption keys for digital currency and possibly also other auxiliary information necessary for the compilation of the address for backing. The application derives the address of backing and communicates it to the issuer. Subsequently, he sends to this address the corresponding amount of backing (equal to the denomination of the payment instrument). Then, using the application for issuance, he asks the online service of the manufacturer for the digital signature 3A. If all formalities are met (it is an authentic means of payment, the amount sent for backing corresponds to the denomination, etc.), the digital signature 3A is generated. The application for issuance then suitably combines it with the first authorization factor 2A and produces a format to facilitate the issuer a suitable completion of the medium, e.g. print version.

Once the necessary information is filled in on the medium, the process of issuance is by the end, and there is a new duly backed physical medium of encryption keys. If desired, the issuer may verify it (see below).

At this point the issuer cannot control the funds used for backing unless the medium is devaluated (see below). The same funds cannot be used for backing another medium or another payment in digital form. The funds are tightly bound to a specific medium whose current holder is in an exclusive position to control the relevant backing in digital currency.

Verification of Physical Medium of Encryption Keys

The procedure of verification is shown in FIG. 19. The verifier (usually the recipient of a physical medium of encryption keys) uses a software application for verification, which can be freely downloaded on the internet. However, at the time of verification, regardless of the number of verified media, there is no need to be on-line any more. First, the verifier visually checks the medium to see if it is backed (i.e. if the box for the first authorization factor 2A and the box 3 for the digital signature 3A are not blank). An apparently blank, unbacked medium should be rejected as a payment means straightaway. To complete the visual inspection, security features should be also checked depending on the particular embodiment of the invention, e.g. in case of paper form the watermark, hologram, etc.

Then the verifier starts the software application, loads the first authorization factor 2A and the digital signature 3A from the medium, and the application verifies whether the digital signature 3A is genuine and to which medium and denomination it relates. The verifier visually checks if the medium in his hands is marked with a correct denomination and equipped with an appropriate identifier, and in case of conformity, he accepts the medium. If he finds out any difference in the identifier or denomination, he refuses to accept the medium for payment.

Part of the inspection with the use of the software application is the validation of the first authorization factor 2A. If the medium contains a faulty, damaged or totally inadequate first authorization factor 2A, the application notifies the verifier of this fact and the verification ends with a negative result.

Devaluation of Physical Medium of Encryption Keys

The procedure of devaluation is shown in FIG. 20. At this point we mean devaluation with the intention of transferring the corresponding backing back into the electronic form. Of course, there are many possibilities to destroy the payment instrument depending on the material used, e.g. by heat, chemical solvents, etc. However, its mere physical destruction without prior loading of the first 2A and possibly the second 5A authorization factor, would cause a complete irreversible destruction of the corresponding digital currency units (similarly to burning a valid banknote). We expect most users to be driven by rational motives and carry out the destruction in order to obtain the digital currency used.

The user loads the first authorization factor 2A. In case there is also the second authorization factor 5A in a tamper-evident mode, he removes the tamper-evident protection so as to get the information about the second authorization factor 5A. In reality it may be scratching off a box, peeling off a destructive sticker, breaking or tearing the body of the payment means, etc. Then the user redeems the funds to his private address using a software application.

Construction Nature of the Proposed Technology of Physical Medium

First to be introduced in the text and attached figures is the basic element of the transfer of encryption keys for digital currency through the process of issuance, validation and devaluation of physical medium with multi-factor authorization, thus the construction of a physical medium of encryption keys for digital currency. It is made of a flat plane base body of any shape (in particular a geometrical figure), and compact materials (especially plastics, paper, metals and their alloys) with one of its major plane surfaces identified with the unique alphanumeric identifier 1. This physical medium of encryption keys for digital currency contains, depending on a particular model, applications of protective features against counterfeiting, with one or both major plane surfaces having box 2 for receiving the first authorization factor 2A box 3 for adding the digital signature 3A, and, if the case, also box 5 for the second authorization factor 5A in a temper-evident mode.

The base body, a flat plane object, is preferably in the shape of a square, rectangle or circle, or in the shape of a standard credit card, coin or banknote. On either side it provides information on the denomination and currency unit.

Physical media of encryption keys embodied in paper form bear applications with protective features against counterfeiting, in particular special security paper with watermarks and/or metallic strips, optically variable elements, very fine graphics called guilloches, iris colour gradations, colours with UV or IR luminescence, chemically reagent colours, or inaccessible printing methods.

In case of embodiment in plastic cards, the protective features against counterfeiting are mainly holograms, and in case of embodiment in metal coins the protective features against counterfeiting are preferably diffractive security elements (kinegrams) or electronic RFID chips. The unique alphanumeric identifier 1 is turned into a secured element, i.e. in particular recoated with iridescent varnish, punched or an optically variable element. One of the solutions brings box 2 for the first authorization factor 2A and box 3 for the digital signature 3A in one shared box.

The technology of physical medium of encryption keys for digital currency is based on the following building blocks: security printing features, multi-factor authorization, digital signature and possibly also tamper-evident features.

The present invention is a physical object which is protected against counterfeiting with security features and identified by the unique alphanumeric identifier 1. At once, it contains box 2 for receiving the first authorization factor 2A, which makes, after a proper issuance of the medium, at most half of the amount of information necessary for the control of the digital backing. The object further contains box 3 for adding the digital signature 3A. These two pieces of information are to be provided by the customer, along with the funds in digital currency heeded to back the medium. It is also preferable if the physical medium of encryption keys contains box 5 with the second authorization factor 5A protected by a security feature of tamper-evident nature, in other words readable only with an evident devaluation/damage of the whole object.

Detailed Description of the Medium

Dimensions, weight, material and shape: the embodiment of the medium of encryption keys for digital currency may theoretically be of any size, however, to make its use in physical payment transactions between individuals practical and comfortable, presumably the size of each single piece should range from units to tens of centimetres, with its volume minimized for the reason of space-saving storage.

Similarly, the medium weight should not exceed several units of grams as manipulation with much more massive media of encryption keys would certainly lead to a reduction in payment ergonomics. Theoretically, a medium of any weight may be produced though.

The medium material is not precisely given either. It is desirable to use a material which provides durability, reasonable wear resistance, and acceptable production costs even in large quantity batches, typically paper, plastic or metal. Neither the shape of the present invention is specified, preferably it should be a plane (flat) shape.

Dimensions, weight, material and shape are not essential for the embodiment of the invention, but they must not impede the use of before-mentioned key elements, which the physical medium of encryption keys must contain.

In this text we work with three possible physical embodiments, in their size, weight, material and shape most closely resembling the current well-established means of payment, i.e. a coin, a bill and a plastic card (FIG. 12). However, it is to be pointed out again that possible embodiments of the present invention are not limited to these three options, and theoretically entirely different combinations of materials, weights, sizes and shapes can be produced.

Protection against Counterfeiting and Forgery

The medium of encryption keys must ultimately hamper any attempts at forgery. In case of a paper/polymer embodiment, security print is to be used, i.e. technologies leading to the production and application of a variety of security features typical in the banknote production. These involve e.g. special security paper with watermarks and/or metallic strips, so-called optically variable elements ("holograms", iridescent varnish, special colours), commonly inaccessible printing methods such as gravure or highly accurate offset printing, very fine geometric graphic elements called guilloches, iris colour gradations, colours with UV or IR luminescence, thermochromic or chemically reagent colours, etc. There are many protective features and production technologies, and their particular selection depends on the choice and production possibilities of the manufacturer of payment means.

Plastic cards can also be equipped with optically variable elements ("holograms"), printed in special colours, embossed, etc.

Metal coins can be equipped with an optically variable element KINEGRAM (Lit. 5), or an electronic RFID chip (Lit. 6).

Distinguishability and Uniqueness

Each single medium must be marked with the unique alphanumeric identifier 1. The uniqueness is secured by the manufacturer who selects a suitable set of identifiers, which need not form a continuous series, on the contrary, it appears preferable to use sufficiently long chains looking random at first glance. For example:

4DaFvf3RumoW67B2rXAMdx72VycebHksU
KgtbGgaX2ngstNpvyv7LwpHSweVeqGbpM
NH9od4H3XQupviN8pRGQ6uteVm1qd9KF4, etc.

Such identifiers, if of sufficient length, and thus of sufficiently large combinatorial space, basically eliminate the chance of a potential forger to guess them and to produce forgeries of unavailable pieces. The authentication (see below) includes an automated inspection of identifier, i.e. a forgery with a non-compliant, e.g. invented, identifier would be immediately detected.

Examples of the use of alphanumeric identifiers 1 are given in FIGS. 13, 15 and 16.

Protection against Modifications of Identifier

With respect to the nature of the invention, when the free market offers both unbacked (blank) and duly backed media, i.e. not every medium bears always the value corresponding to the indicated denomination, it is necessary to ultimately hamper any efforts to modify the identifier in order to avoid counterfeiting by turning an unbacked piece into a backed one. The following example demonstrates that if an identifier were in form of an ordinary number of a continuous series printed in a conventional technology, a forger would need to get only two original unbacked pieces with consecutive identification numbers. After properly backing one with digital currency, i.e. issuing a valid medium of encryption keys, he would then modify the second piece so that the identifier was identical with the first one and transfer there also other key elements (see below). That way he would receive a very successful fake. In case of the numerical identifier of a continuous series it is in fact sufficient to alter one (the last) digit of either of two consecutive numbers. On the contrary, with the use of long alphanumeric identifiers 1 of a discontinuous series, as outlined above, a forger would have to alter a lot of characters, often the entire chain. Additionally, if the identifier is turned into a protected feature, e.g. recoated with iridescent varnish, typeset, punched, or optically variable, then any efforts of a potential forger to modify the identifier become much more difficult and there will be no chance to carry out an attack on the valuable means by the identifier modification.

Box 2 for the First Authorization Factor 2A

On a medium of encryption keys for digital currency, there is a clearly visible box 2 to fill in the first authorization factor 2A, i.e. the first part of information which is needed to control the amount of digital currency used to back up the medium. It is not important which way the first authorization factor 2A is added: it may be printed on the medium, glued, hand-written, engraved, punched, laser burned, cut, etc.

The first authorization factor 2A need not be protected by security features, it must only be readable and reasonably durable and resistant for the purpose of physical payments. Box 2 to fill in the first authorization factor 2A therefore does not require any special technology.

The element is shown in FIGS. 14, 15 and 16.

Box 3 for Digital Signature 3A

On the medium of encryption keys for digital currency, there is a clearly visible box 3 to fill in the digital signature 3A. It is not important which way the digital signature 3A is added: it may be printed on the medium, glued, hand-written, engraved, punched, laser burned, cut, etc.

The digital signature 3A need not be protected by security features, it must only be readable and reasonably durable and resistant for the purpose of physical payments. Box 3 to fill in the digital signature 3A therefore does not require any special technology.

Digital signature 3A at this point means a physical representation of data generated by the digital signature technology. The data can be represented in binary, octal, decimal, hexadecimal or other suitable system and form an alphanumeric chain readable with the naked eye or machine-readable graphics (bar code, QR code), or both together.

Under certain circumstances, it may be practical to combine the first authorization factor 2A and the digital signature 3A in a single box, and so simplify the process of medium issuance and verification. Thus, this version of the medium of encryption keys has only one box to fill in both pieces of information at once as shown in FIGS. 14 and 16.

Second Authorization Factor 5A

The second piece of information protecting the digital currency backing is provided by the manufacturer of medium and called the second authentication factor 5A. Depending on whether the second authorization factor 5A is integrated in the medium, there are two different forms of embodiment.

a) Preferably, the second authorization factor 5A is incorporated into medium in form of a protected tamper-evident box to reliably detect penetration, which in this case happens by merely reading the second authorization factor. Therefore there is an aim to add the second authorization factor 5A to medium in such a way that once read, there will be a visible (evident) change of the element, or the entire medium, in the sense that at first glance it will appear devaluated. An example might be scratch-off tickets or destructive stickers used by bank corporations to send PINs to payment cards by post. Optionally, the second authorization factor 5A may be encapsulated inside the body of a means of payment so that it is necessary to disassemble/split the means into two parts to read it. This approach is used in Lit. 7. It is important that the process of modification be irreversible and reliable, i.e. not circumvented and the information obtained without an evident modification/devaluation of medium at the same time, not even by sophisticated physical or chemical technologies.

If a medium of encryption keys for digital currency contains the second authorization factor 5A in form of a tamper-evident box, there is no need of an intermediary for a reverse change of the currency from the physical to the electronic representation, and the last holder can redeem the funds used to back up the medium using only a "smart" mobile phone or tablet with the relevant SW equipment and an internet connection. At the same time, this solution option is both technically and financially more demanding for media manufacturers.

b) Simpler as well as cheaper to produce may be the solution option where the second authorization factor is not integrated into the medium of encryption keys, but the whole time it is known only to the medium manufacturer. At the same time, however, the manufacturer becomes the only entity who is able to change the physical representation of digital currency (a medium of encryption keys) back to an electronic representation, i.e. to redeem backing. This in fact means that if a current holder of a duly issued (backed) medium decides to change the representation of the physical currency back to the electronic form, he must deliver the medium back to the manufacturer to receive the relevant funds. At the same time the manufacturer has to guarantee that the withdrawn medium will undergo a definitive destruction.

The need to return the medium back to the manufacturer in order to cancel the backing makes this model logistically and procedurally challenging, and at once the manufacturer becomes the central point for potential attacks by counterfeiters, however, this model eliminates the costs of tamper-evident technologies, which can make the production of physical media of encryption keys significantly cheaper.

Denomination

The medium of encryption keys for digital currency in a backed state should always contain a clearly readable information 4 about the denomination and currency unit, or the name of the currency itself.

The medium may already be produced with this information and marketed in several different denominations, or the choice of the nominal value may stay with the issuer (similarly to cheques). In that case the medium must offer an adequate box to fill in this information (FIG. 16).

Layout of Elements

Within the medium of encryption keys for digital currency, the elements are distributed in accordance with the ergonomics of use, while taking into account in particular the procedure of medium verification, which is supposed the be the most common activity carried out with a medium. Secondarily, the procedures of issuance and devaluation are also taken into consideration. However, theoretically, the particular layout of the elements is not important as the core of the present invention is not affected, e.g. a paper embodiment (FIG. 15) does not need to have all elements placed on the obverse side, but both the boxes for print may be moved to the reverse side. There is a whole range of possible modifications.

The Summary of Innovation

The Nature of the Physical Medium of Encryption Keys and the Transfer of the Digital Currency Encryption Keys through the Process of Issuance, Validation and Devaluation of Physical Medium with Multi-Factor Authorization The proposed medium of encryption keys for digital currency is of the following nature:

1. This physical representation of digital currency is very difficult to counterfeit.

2. A current holder is in an exclusive position to control the digital currency used for backing a given medium. In other words, none of the previous holders nor the manufacturer can misappropriate the backing.

3. The backing (issuance) of physical medium is easily feasible using commonly available office and computer equipment and an internet connection.

4. The verification of physical medium is easily feasible using commonly available mobile computer equipment and pre-installed software, even with no internet connection.

5. In case a physical medium contains also the second authorization factor in a tamper-evident mode, anyone may cancel the backing and redeem the funds using commonly available (mobile) computer equipment and internet access, but devaluation/evident damage to the medium will occur at the same time.

Compared to current physical products aimed at preserving the balance of digital currencies, the invention means a major qualitative leap forward, mainly due to points 2 and 4 of this chapter.

When compared with currently available means of payment as the products of banks and states (banknotes, coins, cheques), the present invention also brings a fundamental innovation. Commonly available means of payment are based on direct trust (FIG. 5), and if confidence in their manufacturers fades, the payment instruments immediately lose their function and value. A holder cannot directly (factually) control the relevant backing of a given payment instrument. The holder's and the manufacturer's positions are not equal, therefore in case of bankruptcy of the manufacturer or a monetary reform, the holder usually loses the whole value represented by these substitutes.

On the contrary, the present technical solution gives a birth to a means of payment which preserves its value regardless of the economic situation of the manufacturer. In case physical media contain also the second authorization factor in a tamper-evident mode, neither bankruptcy nor possible liquidation of the manufacturer may affect the value of issued media of encryption keys for digital currency as payment instruments. They are still used to store the value and facilitate payments.

This medium of encryption keys for digital currency bears, unlike the mentioned money substitutes, its intrinsic value equivalent to the balance in the digital currency. This intrinsic value is similar as if the means of payment were directly precious metals (gold, silver). Such tenders, usually coins, also have their intrinsic values which are independent of the entity of manufacturer.

The medium of encryption keys for digital currency used as a means of payment retains the advantages identical to conventional modern physical means of payment—low weight and small size. Banknotes were introduced, among other reasons, for the manipulation with large amounts of physical gold seemed impractical. Likewise, the invented medium of cryptographic keys represents a tool which should facilitate payments to people for whom the manipulation with digital currency in its native electronic form is impractical. At the same time, however, it retains its intrinsic value, so it is not a substitute, but rather a physical "envelope" for an electronic currency.

The present invention may be viewed as an instrument for the metamorphosis of digital currency from the electronic to the physical world and back (FIG. 11), with an important fact that once the currency is transferred into the physical world, there is no longer anyone who can use it in the original electronic world. This way can be described the aforementioned principle of the exclusive control of a current holder. Current physical products concerning digital currencies namely use the diagram in FIG. 6, i.e. there are two entities to control the means of payment at the time of its issuance, the manufacturer and the holder. Therefore, any time in the future, the situation shown in FIG. 10 may occur, i.e. the "electronic holder" continues to use the financial resources and the "physical holder" finds out, when trying to devalue the object and transfer the backing back into the electronic environment, that he is no more the current holder, and that he had been robbed.

The metamorphosis between the electronic and physical representation of money is regularly performed when taking cash to the bank/ATM and depositing it on the account or, conversely, when withdrawing money from an account in a bank/ATM and taking it home as cash.

The present invention enables to perform this metamorphosis in the comfort of home and without an intermediary (bank). With the necessary amount of unbacked pieces of the described media of encryption keys for digital currency, and by means of common office and computer equipment and an Internet connection, the electronic representation of currency can be changed into the physical one. In case of physical media with the second authorization factor 5A in a tamper-evident mode, a change in the opposite direction is also possible, with only an Internet connection and a smart mobile phone or tablet.

At the same time, the presented invention does not lack the secondary function of a safe offline storage of digital currency, i.e. it can replace paper wallets and other forms of private keys backups. Thus, even if it is not used in the payment system, it retains its function as a store of value.

Solution Options (1) Physical media of encryption keys for digital currency may miss the part of digital signature 3A, namely in a situation when only the recipient of the payment instrument has an Internet connection, not the payer, e.g. while shopping in a brick-and-mortar shop. The recipient can own a terminal connected to the Internet and use it to directly verify the backing of individual pieces of a means of payment.

(2) Under certain circumstances it may be preferable to leave the second authorization factor with the manufacturer, yet to integrate a secret tamper-evident "password" into the medium, which will remotely prove that the communicating party is the beneficial holder of the payment instrument. This modification thus requires the cooperation of the manufacturer even at the redemption of backing, but it may take place at a distance without a physical contact of the manufacturer with the means of payment. There are a few motivations to go for this option, e.g. to reduce the volume of protected information in a tamper-evident mode in case the production costs and/or vulnerability rise with the volume of protected information and the entire cryptographically strong second authorization factor would be difficult to integrate.

3) Issued means may theoretically be backed by a third party as well. During the issuance process the issuing entity must inform this third party about the address to deposit the funds and then gain the identifier of this transaction. The backing may also be provided by the manufacturer because in certain cases it can accelerate the process of issuance, more precisely the process of generating the digital signature 3A. This modification is based on the presumption that the issuer had previously deposited a certain amount of money by the manufacturer, which is then withdrawn by the issuance of means of payment, i.e. a certain form of pre-deposited funds.

(4) The protection against counterfeiting media of encryption keys for digital currency could theoretically be significantly improved by using a technology called Physical Unclonable Function (PUF), which is currently the collective name for technologies used to produce an object which cannot be copied, duplicated, or functionally forged (Lit. 10, 11, 12, 13) even by means of the most advanced physical and chemical technologies. Unique qualities are achieved by producing an electronic device with unique electromagnetic qualities which stem from the arrangement of molecules and atoms, and therefore it is technically impossible to make an identical copy. In reality, it would mean to equip the medium of encryption keys for digital currency with an electronic chip with PUF implementation, and so replace the unique alphanumeric identifier 1 described in the previous text. For this option would be natural to use the electronic form also for the completion of the first authorization factor 2A and the digital signature 3A by the issuer, i.e. a rewritable memory chip could be integrated. Higher protection of the payment means against counterfeiting would be compensated by higher demands on the equipment of the verifier because he would have to use more advanced equipment to communicate with the electronics built into the medium of encryption keys for digital currency. The resulting product would therefore not be so universally applicable. At the same time, a number of other issues and problems related to the implementation would arise since the area of contact and contactless payment cards equipped with a chip is known for a high amount of potential attacks and vulnerability.

INDUSTRIAL APPLICABILITY

The transfer of digital currency encryption keys through the process of issuance, validation and devaluation of physical medium with multi-factor authorization and the physical medium of encryption keys for digital currency to conduct this transfer technology are applicable in the area of preservation and transfer of values in the payment system.

THE LITERATURE USED IN TEXT AND OTHER SOURCES OF INFORMATION

Lit. 1. Bitaddress. [Online] https://www.bitaddress.org.
Lit. 2. BitcoinPaperwallet.com. [Online] https://bitcoinpaperwallet.com/.
Lit. 3. Wallet Generator. [Online] https://walletgenerator.net.
Lit. 4. BIP 38: Passphrase-protected private key. [Online] https://github.com/bitcoin/bips/blob/master/bip-0038.mediawiki.
Lit. 5. OVD Kinegram AG. [Online] http://www.kinegram.com/.
Lit. 6. Soheil Hamedani, Gregor Innitzer. Coin having integrated did identification device and method for the production thereof. US 20120055996 3 8, 2012.
Lit. 7. Swiss Bitcoin Certificates. [Online] https://www.bitcoinsuisse.ch/en/about-certificates/.
Lit. 8. Shamir, Adi. How to share a secret. Communications of the ACM. 1979, Vol. 22.
Lit. 9. BIP 16: Pay to Script Hash. [Online] https://github.com/bitcoin/bips/blob/master/bip0016.mediawiki.
Lit. 10. Christoph, Bohm a Maximilian, Hofer. Physical Unclonable Functions in Theory and Practice. Place unknown: Springer, 2012.
Lit. 11. Pappu, R., at al. Physical one-way functions. Science. 2002, 297.
Lit. 12. Naccache David, Fréemanteau Patrice. Unforgeable identification device, identification device reader and method of identification. EP0583709 1992.
Lit. 13. Roel, Maes. Physically Unclonable Functions: Constructions, Properties and Applications. Place unknown: Arenberg Doctoral School of Science, Engineering & Technology, 2012.
Lit. 14. Feigelson, Douglas. Creating and using digital currency. US 20130166455 6 27, 2013.

REFERENCE SIGNS

1 Alphanumerical identifier
2 Box for filling in the first authorization factor
2A The first authorization factor
3 Box for filling in the digital signature
3A Digital signature
4 Information on the denomination and the currency unit
5 Box for filling in the second authorization factor
5A The second authorization factor
6 Box for filling in the denomination
7 Symbol of digital currency

The invention claimed is:
1. A method of a transfer of digital currency encryption keys through a process of issuance, validation and devaluation of a physical medium with multi-factor authorization, comprising:
   distributing, by a manufacturer, a blank physical medium;
   integrating, by the manufacturer, a second authorization factor into the medium in form of a tamper-evident box;
   loading, by an issuer using a software application for medium issuance, the medium, wherein the issuer is an entity different from the manufacturer;
   generating, by the issuer, a first authorization factor;
   deriving, by the issuer, an address by combining the first authorization factor with an identifier of the medium;
   sending, by the issuer and to the address, an amount of the digital currency equivalent to a denomination of the medium;
   authenticating, by the manufacturer or an independent entity, the medium and the amount of the digital currency;
   sending, by the manufacturer or an independent entity, a digital signature to the issuer after meeting all requirements on authenticity of the medium and the transferred amount of the digital currency being equal to the denomination of the medium;
   combining, by the issuer, the digital signature with the first authorization factor using the software application designated for medium issuance and adding these data to the medium by print, hand-write or as a sticker and thus the medium becomes activated and the process of issuance is completed;
   passing, by the issuer, the activated medium to a subsequent holder;
   visually inspecting, by the subsequent holder, protective features against counterfeiting present on the medium;
   reading, by the subsequent holder using a software application for medium verification, the digital currency amount, the authenticity of the digital signature, and the first authorization factor that was added to the medium by the issuer;
   verifying, by the subsequent holder using the software application for medium verification, the digital currency amount, the authenticity of the digital signature, and the first authorization factor;
   loading, by an ultimate holder using a software application for medium redemption, the first and second authorization factors available on the medium;
   compiling and authorizing, by the ultimate holder, an electronic transaction in a digital currency network using the first and second authorization factors to redeem funds in electronic form to a private address of the ultimate holder after which the process of devaluation is complete;
   transferring, by the ultimate holder, the digital currency amount from the medium to the private address of the ultimate holder.
2. The method of the transfer of the digital currency encryption keys through the process of issuance, validation and devaluation of physical medium with a corresponding amount of digital currency and with multi-factor authorization according to claim 1, wherein the ultimate holder, who redeems the digital funds and devalues the medium, is its original manufacturer; and
   using, by the manufacturer, other authorization factors not present on the medium and known only to the manufacturer for compilation and authorization of the transaction.

3. The method of the transfer of the digital currency encryption keys through the process of issuance, validation and devaluation of physical medium with a corresponding amount of digital currency and with multi-factor authorization according to claim 1, wherein the software application for medium issuance, the software application for medium verification and the software application for the redemption of the digital currency funds are open-source applications, publicly accessible on the Internet.

4. The method of the transfer of the digital currency encryption keys through the process of issuance, validation and devaluation of physical medium with a corresponding amount of digital currency and with multi-factor authorization according to claim 1, wherein the software application for medium issuance, the software application for medium verification and the software application for the redemption of the digital currency funds in fact form only one software application.

\* \* \* \* \*